May 28, 1957  W. E. STARY  2,793,724
PRESSURE-TIGHT WINDOW
Filed July 14, 1953

INVENTOR
Walter E Stary

United States Patent Office 2,793,724
Patented May 28, 1957

2,793,724
PRESSURE-TIGHT WINDOW
Walter E. Stary, Levittown, Pa.
Application July 14, 1953, Serial No. 367,831
3 Claims. (Cl. 189—78)

This invention relates to pressure-tight window devices having a transparent-plate member. Said devices are attached to pressure vessels or liquid storage tanks to provide a means for observing some portion of the interior of said vessels or for determining the level of a liquid inside said vessels or tanks.

There are many such pressure-tight window devices now in use, but most of them involve complex assemblies of parts and require a considerable amount of time to assemble.

The principal object of this invention is to provide a pressure-tight window assembly which can be easily and quickly assembled.

Another object is to provide a pressure-tight device in which pressure tends to more tightly seat the gasket to thus effect a better seal to keep the unit pressure tight.

A further object is to provide a window unit in which the housing can be welded to the pressure vessel and then, after all welding and other work which might result in braking of the transparent-plate member is completed, the other parts of the pressure-tight assembly can be assembled in a final assembly operation with no further machining of said housing.

These and other objectives and advantages of this invention will become apparent from the following description when taken in connection with the accompanying drawings, in which.

Figure 1:
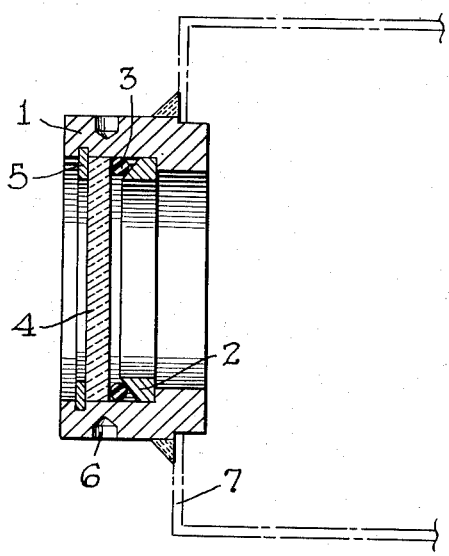
Fig. 1 is a section through center of one form of this pressure-tight window.

Fig. 1 shows a preferred form of this invention assembled into the side of a tank 7. Housing 1 is a ring having the cross section shown. Said housing is set into a hole in the tank and welded as shown.

Ring 2 has a square surface on its inner end so that it seats solidly into a counterbored hole in housing 1. The conical surface on the outer end of ring 2 provides one side of the "half-V-shaped" seat for gasket ring 3.

Transparent-plate 4 is pushed firmly into the assembly to seat the gasket in the following manner. Plate 4 bears against gasket ring 3 and forces said gasket to slide back on the cone of ring 2 slightly. Gasket 3 sliding back on said cone is stretched to thus increase its diameter. Thus gasket ring 3 is pushed and compressed out of its normal shape so that it bears firmly against the conical surface of ring 2, against the inner surface of housing ring 1, and against the inner surface of transparent-plate 4.

The assembly-clamping ring 5 is a spring-type expansion ring which expands to seat firmly in the groove provided in the inner surface of housing ring 1. The groove for ring 5 is positioned so that plate 4 must be pushed firmly against gasket ring 3 to properly seat said gasket, as previously described, to get plate 4 clear of said groove so that assembly-clamping ring 5 can expand and slide into said groove. Thus ring 5 clamps the assembly together holding gasket 3 compressed.

Pressure inside tank 7 produces the following reactions. Pressure acts on the exposed area of plate 4 producing a force tending to push plate 4 out of housing ring 1, thus imposing a shear loading on ring 5. Pressure also acts on the exposed inner surface of gasket ring 3 to expand it radially and force it more solidly against the inner surface of housing 1.

Pressure seeping through the joint formed by the mating surfaces of ring 2 and the inner surface of housing ring 1 acts on the exposed surface of gasket ring 3 at the crotch of the V groove, but this force is less than the pressure-developed force acting on the inner exposed-surface of said gasket ring 3 because of the ratios of the areas of the respective surfaces. Thus gasket ring 3 continues to remain compressed and tightly pressed against the several surfaces to be sealed against pressure escaping past said surface to thus escape out through the unsealed portions of the assembly.

Holes 6, in the rim of housing 1, provide a means for anchoring the legs of a gear-puller type assembly tool. Thus, with the tool legs hooked to the housing, pressure is applied to push plate 4 inward so as to compress gasket ring 3 by turning the clamp screw. Plate 4 is pushed inward to allow clamp-ring 5 to expand freely into its groove in housing 1. Then, when the assembly tool is removed, clamp-ring 5 holds the assembly together so as to keep gasket ring 3 compressed.

Figure 2:
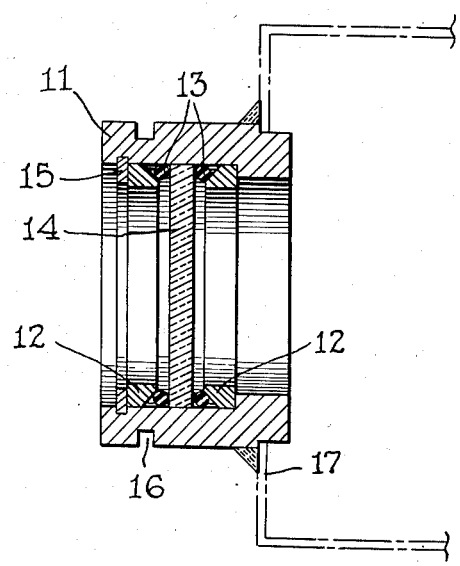
Fig. 2 is a section through center of another form of this window device.

Fig. 2 shows an alternate form of this device with seals on both sides of the transparent plate. The Fig. 2 arrangement is suitable for applications subject to pressure from either side, that is, where the vessel may be under pressure, or under vacuum so that atmospheric pressure would tend to leak into the vessel.

Housing 11, ring 12, the inner gasket 13, and transparent plate 14 duplicate in form and function housing 1, ring 2, gasket 3, and plate 4, respectively, of Fig. 1. The Fig. 2 form of this device has a second gasket ring 13 on the outside of transparent plate 14. A second ring 12, assembled with the conical face inward, controls the outer gasket ring 13.

The assembly is compressed to get the outer face of ring 12 clear of the groove in housing 11 so that assembly-clamping ring 15 can expand to seat itself in said groove to thus hold the assembly compressed and pressure tight.

Gaskets 13 act to seal the device to prevent pressure escaping as described for gasket 3 in Fig. 1. The gasket 13 on the side exposed to pressure acts the same as gasket 3 in Fig. 1, as hereinbefore described.

Groove 16, in the rim of housing 11, provides a means for anchoring the legs of a gear-puller type assembly tool. Said assembly tool serves to clamp the assembly together to allow assembly-clamping ring 15 to expand into the groove provided in the inner surface of housing 11, all as described in connection with the Fig. 1 form of this invention.

For convenience, ring 2 in Fig. 1, and inner ring 12 in Fig. 2, are shown as being separate rings inserted into a counterbored hole in their respective housings. However, the sole function of ring 2, and ring 12, is to provide the conical surface to direct the gasket ring. Said conical surface could be obtained without using the separate ring by machining housing 1 or housing 11 to provide the conical surface as an integral part of said housings.

Another arrangement of the gasket seating surface is an integral seat, machined as a part of the housing, with a V seat in which each half of said V has the same angle. Other combinations of angles on the gasket seat, both for integrally formed seats and for seats formed on a separate insertible ring are suggested by these forms hereinbefore described. The principal objective in forming the gasket seat being to get a seat to control the position of the gasket when it is compressed by the transparent plate, and if the gasket seat is formed on an insertible ring, then the seat angles should direct the gasket and force it to hug the inner surface of the housing so that pressure cannot escape along said inner surface of the housing and past the gasket.

The gasket rings shown have a round cross section identical to the conventional O rings. However, rings of other cross sections are equally suitable. These other sections include rings with an octagon shape, and with a triangular shape to match the shape of the gasket seat and the adjacent surfaces confining said gasket.

The transparent plates can be made of glass, or a plastic suitable for the liquids being confined, and in thicknesses suitable for the pressure requirements.

The assembly-clamping ring can be a conventional spring-type expansion ring, or for larger or higher-pressure units the clamp ring can be of a larger cross section made in segments with a locking segment retained by one or more screws or bolts.

The forms illustrated show the housing welded to the pressure vessel. However, this invention is not limited to such a method of attachment for said housing could be attached by means of a conventional pipe thread, or it could be bolted to the vessel.

Another arrangement for attaching said housing to the wall of a pressure vessel is to insert said housing through a close fitting hole in the wall of said vessel, then use a gasket seal ring with a gasket controlling ring having an internally-formed conical seat to confine and compress said gasket with a contracting type of assembly-clamping ring to hold the unit in position in the wall of said vessel. This unit would confine the gasket sealing the joint between the vessel and the window housing in a manner similar but opposite in reactions to the outer ring 12 in Fig. 2. Such an assembly would eliminate welding said housing to the wall of its pressure vessel.

While the invention has been described with reference to the particular devices illustrated, it is to be appreciated that it is not so limited. It is rather of a scope commensurate with the scope of the subjoined claims.

What I claim as my invention is:

1. In a pressure-tight window having a housing, a compressible gasket ring, a transparent circular plate, and an expansion-type retaining ring, with said housing having a through hole shaped to include a frusto-conical gasket seat and a retaining-ring groove, with said groove positioned relative to said gasket seat so that said gasket is forcibly compressed into the annular space between said frusto-conical surface, the inner surface of said housing and the inner surface of said transparent circular plate, when said parts are assembled, so that said gasket thus provides the pressure-tight seal between said members; means whereby a clamping device may be connected to said housing so that the portion of said clamping device bearing against the outer surface of said transparent circular plate member acts to produce a force imposed on said plate member causing said plate member to move inward relative to said housing to thus transmit said clamping force to said compressible gasket ring so as to compress said gasket ring, with said movement of said transparent circular plate member producing the final-assembly position of said members so that said retaining ring may be freely expanded into its seating groove.

2. In a pressure-tight window having a housing, a compressible gasket ring, a transparent circular plate, and an expansion-type retaining ring, with said housing having a through hole shaped to include a V-shaped gasket seat and a retaining-ring groove, with said groove positioned relative to said gasket seat so that said gasket is forcibly compressed into the annular space between said V-shaped gasket seat and the inner surface of said transparent circular plate, when said parts are assembled, so that said gasket thus provides the pressure-tight seal between said members; means whereby a clamping device may be connected to said housing so that the portion of said clamping device bearing against the outer surface of said transparent circular plate member acts to produce a force imposed on said plate member causing said plate member to move inward relative to said housing to thus transmit said clamping force to said compressible gasket ring so as to compress said gasket ring, with said movement of said transparent circular plate member producing the final-assembly position of said members so that said retaining ring may be freely expanded into its seating groove.

3. Means as in claim 2; for a pressure-tight window wherein the housing of said window has the surface of its through hole, adjacent to said V-shaped gasket seat, positioned relative to said gasket seat so as to confine said compressed gasket so as to prevent said gasket from moving radially when pressure is applied in the interior portion of said window assembly.

References Cited in the file of this patent

UNITED STATES PATENTS

| | | |
|---|---|---|
| 960,926 | Hoops, Jr. | June 7, 1910 |
| 2,568,124 | Gravel | Sept. 18, 1951 |

FOREIGN PATENTS

| | | |
|---|---|---|
| 700,411 | Germany | Dec. 19, 1940 |